(12) United States Patent
Chung

(10) Patent No.: US 10,843,061 B1
(45) Date of Patent: Nov. 24, 2020

(54) STRUCTURAL FENDERS FOR LATERALLY-SPACED WHEELS ON A RIDING DEVICE

(71) Applicant: Rasyad Chung, Berkeley, CA (US)

(72) Inventor: Rasyad Chung, Berkeley, CA (US)

(*) Notice: Subject to any disclaimer, the term of this patent is extended or adjusted under 35 U.S.C. 154(b) by 0 days.

(21) Appl. No.: 16/737,798

(22) Filed: Jan. 8, 2020

Related U.S. Application Data

(63) Continuation-in-part of application No. 16/556,517, filed on Aug. 30, 2019, and a continuation-in-part of application No. 16/405,730, filed on May 7, 2019, now Pat. No. 10,695,655, and a continuation-in-part of application No. 16/396,406, filed on Apr. 26, 2019, now Pat. No. 10,709,959.

(51) Int. Cl.
| | | |
|---|---|---|
| A63C 17/02 | (2006.01) | |
| A63C 17/00 | (2006.01) | |
| B62D 25/08 | (2006.01) | |
| A63C 17/06 | (2006.01) | |
| A63C 17/01 | (2006.01) | |

(52) U.S. Cl.
CPC .......... *A63C 17/002* (2013.01); *A63C 17/015* (2013.01); *A63C 17/064* (2013.01); *B62D 25/081* (2013.01); *A63C 17/0093* (2013.01)

(58) Field of Classification Search
CPC ... A63C 17/002; A63C 17/015; A63C 17/064; A63C 17/0093; A63C 17/0006; B62D 25/081
USPC .................................................... 280/87.042
See application file for complete search history.

(56) References Cited

U.S. PATENT DOCUMENTS

| | | |
|---|---|---|
| 6,182,987 B1 | 2/2001 | Bryant |
| 6,224,076 B1 | 5/2001 | Kent |
| 6,474,666 B1 | 11/2002 | Andersen et al. |
| 6,520,517 B1 | 2/2003 | Chung et al. |
| 6,616,163 B2 * | 9/2003 | Lee .................. B62K 3/002 280/220 |
| 6,793,224 B2 | 9/2004 | Stratton |
| 7,044,485 B2 | 5/2006 | Kent et al. |
| 7,104,558 B1 | 9/2006 | Saldana |
| 8,579,300 B2 | 11/2013 | Fraley |
| 8,800,935 B2 | 8/2014 | Francis |
| 9,145,030 B2 | 9/2015 | Williams |
| 9,821,215 B2 | 11/2017 | Ivazes |
| 9,901,807 B2 | 2/2018 | Su |
| 10,160,507 B2 | 12/2018 | Chung |
| 10,265,606 B1 | 4/2019 | Chung |
| 10,376,773 B2 | 8/2019 | Chung |
| 2004/0145142 A1 | 7/2004 | Wang |
| 2010/0123295 A1 * | 5/2010 | Landau ............... A63C 17/01 280/87.042 |

(Continued)

*Primary Examiner* — John D Walters
(74) *Attorney, Agent, or Firm* — Adams Law Office; Sharon Adams

(57) ABSTRACT

The present invention comprises structural fenders for a riding device with laterally-spaced wheels, for example on a skateboard. Each wheel is covered by a structural fender that supports the wheel axle on each side of the wheel. Each wheel may have its own axle, or a pair of laterally-spaced wheels may have a single axle. The structural fenders may be used with a skateboard, scooter, or other riding device, and may be connected with a truck hanger comprised of three rigid bodies connected by revolute and spherical joints and a single compliant body to provide three primary motions: leaning, steering, and floating.

14 Claims, 10 Drawing Sheets

(56) References Cited

U.S. PATENT DOCUMENTS

| | | |
|---|---|---|
| 2011/0316245 A1 | 12/2011 | Burke |
| 2014/0027989 A1 | 1/2014 | Baumann |
| 2014/0091565 A1* | 4/2014 | Feyers .................. A63C 17/01 280/851 |
| 2020/0172191 A1* | 6/2020 | Malheiro ............... B62K 27/12 |

* cited by examiner

STRUCTURAL FENDERS FOR LATERALLY-SPACED WHEELS ON A RIDING DEVICE

CROSS-REFERENCE TO RELATED APPLICATION

This application is a continuation-in-part of U.S. patent application Ser. No. 16/396,406 filed on Apr. 26, 2019, which is incorporated herein in its entirety, a continuation-in-part of U.S. patent application Ser. No. 16/405,730, filed on May 7, 2019, which is incorporated herein in its entirety, and a continuation-in-part of U.S. patent application Ser. No. 16/566,517, filed on Sep. 10, 2019 which is incorporated herein in its entirety.

STATEMENT REGARDING PRIOR DISCLOSURES BY THE INVENTOR OR A JOINT INVENTOR

The following disclosure is submitted: U.S. Pat. No. 10,265,606 issued on Apr. 23, 2019.

BACKGROUND OF THE INVENTION

The wheels of most skateboards are small enough to position underneath the deck which protects the rider's feet from contact with the wheels. Small wheels generally require smooth riding surfaces whereas larger wheels may be used on rougher surfaces. Skateboard designs that support the use of larger wheels generally require cutouts in the deck that allow the wheels to extend above the top surface of the deck. Unfortunately, the use of deck cutouts exposes the moving surface of the wheels to contact with the rider's feet. Touching the wheels of a skateboard or scooter when riding is potentially hazardous with the possibility of abruptly stopping the wheel, turning the truck, or foot entrapment between the moving wheel and the deck, all separately or at the same time. Even light contact between the rider's foot and the moving surface of a wheel may disrupt balance and cause a fall.

The hanger of traditional trucks contains a wheel axle or axles that extend and cantilever outward to support the wheel bearings. Wheels that slide onto the axle from the distal ends and are secured by nuts. The axle of a conventional hanger is generally one piece, molded within the hanger, and must be sufficiently strong to support the weight of the rider with the wheels cantilevered off the ends of the axle.

Existing fenders for skateboards provide a degree of protection from contact between the rider's feet and the surface of the wheel. In general, existing fender designs are accessory parts that bolt on to the threaded end of an axle of a conventional truck to the outside of each wheel. These fender designs support the fender on one side only and do not add support for the wheel bearing axle and wheel.

The present invention is a new hanger design with structural fenders for lean steering spatial mechanisms that support the wheel bearing axles on each side of each wheel and that helps to prevent contact of the rider's feet with the moving surface of the wheels.

Existing lean-steering spatial mechanisms of skateboards, scooters, kickboards, skates and the like are commonly referred to as a "truck-assembly", or simply a "truck". A truck typically comprises two rigid bodies generally referred to as a baseplate and a hanger where the baseplate is mounted to a deck or frame and the hanger supports two laterally spaced wheels that roll on the ground. The rigid bodies of baseplate and hanger are kinematically linked so as to allow rotation relative to each other about a common axis defined by the geometry of the baseplate called herein the "hanger pivot axis". The compliant bodies of existing trucks are compression springs or elastomeric bushings that are sandwiched between and held in place by the rigid bodies of the assembly.

Riding devices as described typically comprise a deck or frame upon which the rider stands with wheels constrained by the plane of the ground, wherein leaning input results in steering output such that a rider standing on the deck leans the deck right to steer right and leans left to steer left.

Spatial Mechanism Definitions Order of Discussion and Dependency.

The trucks of prior art and the present invention are defined as lean steering spatial mechanisms that follow the logic that unique kinematic designs produce unique kinetics which in turn, produce unique ride dynamics.

Kinematics

As described and defined herein the present invention is a lean steering spatial mechanism comprised of both rigid and compliant bodies connected by kinematic joints and constrained by wheels on the plane of the ground.

Rigid bodies are herein defined as not to deform under the action of applied forces.

Compliant bodies are herein defined as flexible bodies that couple and constrain the motion of the rigid bodies and so transfer input forces and displacements to an output force and displacement at another location through elastic body deformation.

Specific joints will be described that define kinematic pairs of rigid bodies and the resultant degrees of freedom of the kinematic chain of rigid bodies of the present invention.

Specific geometry of the rigid and compliant bodies and the orientation and relationship of the kinematic joints produce the leaning, steering, and floating motions of the present invention.

The plane of the ground is defined as the fixed frame of the lean steering spatial mechanism of prior art and the present invention. With prior art and the present invention, wheels connect with ground by means of gravity. As used herein "ground" includes any riding surface whether indoor or outdoor.

BRIEF SUMMARY OF THE INVENTION

The present invention comprises a truck with a hanger with two laterally spaced structural fenders, where each structural fender is comprised of an inner side wall connected with an arcuate surface that is connected with an outer side wall to cover the upper portion of each wheel, so that each structural fender partially surrounds one wheel. In some embodiments, the inner side wall and the outer side wall each have a concentric transverse bore that supports the outer ends of a removable axle running through the center of the covered wheel. In these embodiments there is one axle for each wheel. In other embodiments a single axle may support two laterally-spaced wheels. In all embodiments, the side walls of each structural fender cover at least an upper portion of a wheel and the wheel axle axis, so that the transverse bores in the inner and outer side walls support and receive the wheel axle and provide structural support for the wheel axle and wheel to bear weight. The structural fender does not require the use of forks, instead the structural fender itself supports the wheel axle. The structural fender of the present invention may be used with a variety of different truck in skateboards, scooters like kickboards, tricarvers, or other lean steering riding devices human- or electrically-powered.

The invention further comprises a truck with three rigid bodies comprising a baseplate, a hanger, and a floating revolute kingpin. The baseplate may be mounted within a tubular frame that supports a top surface or deck for a rider to stand upon. The baseplate and hanger of the present invention may be connected by means of a floating revolute kingpin with revolute and spherical joints and a compliant body in the form of an elastomeric bushing or by other lean steering mechanisms as are known in the art. The truck provides four primary motions of leaning, steering, floating, and suspension.

BRIEF DESCRIPTION OF THE DRAWINGS OF THE PRESENT INVENTION

Figure 3:
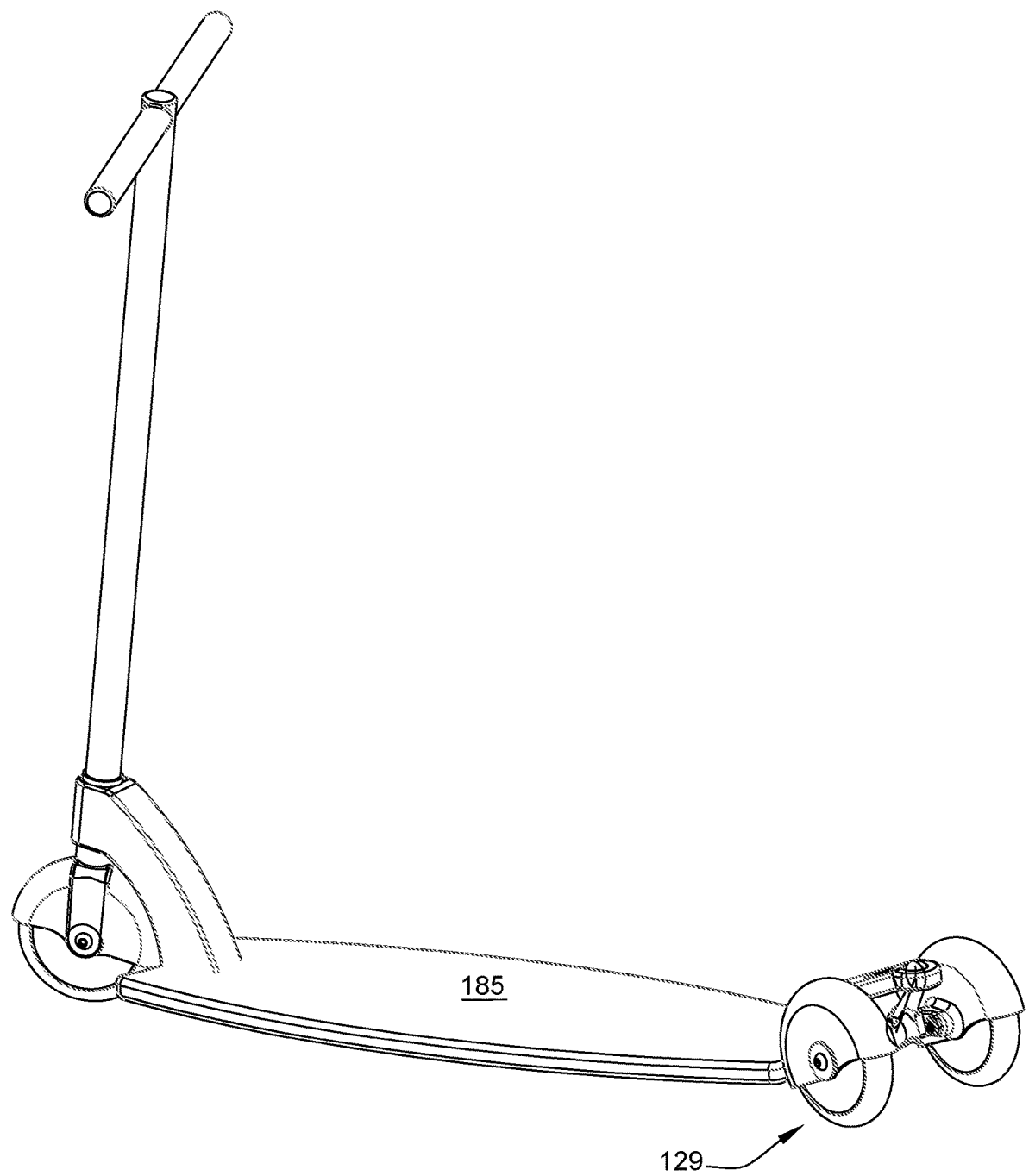

FIG. 3 shows the truck of an embodiment of the present invention mounted to the rear of a three wheeled scooter with combination steering called herein a "tricarver" such that the single front wheel provides bicycle like twist steering, and an embodiment of the truck of the present invention providing rear lean steering. The tricarver is shown leaning left and turning left with the front wheel twist steering slightly left and the truck of the present invention lean steering right as would be typical for a rear truck turning left.

Figure 4:
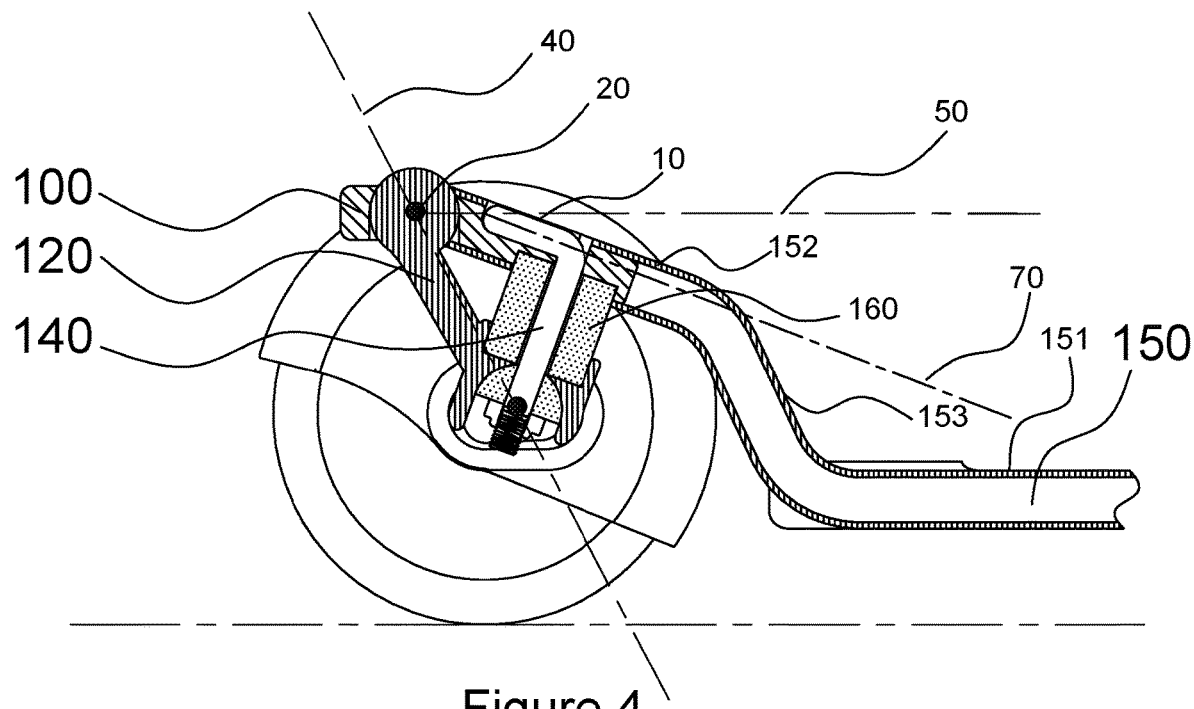

FIG. 4 shows a side section kinematic diagram view of an embodiment of the truck of the present invention mounted within an upwardly inclined end portion of the tubular frame of a skateboard.

Figure 5:
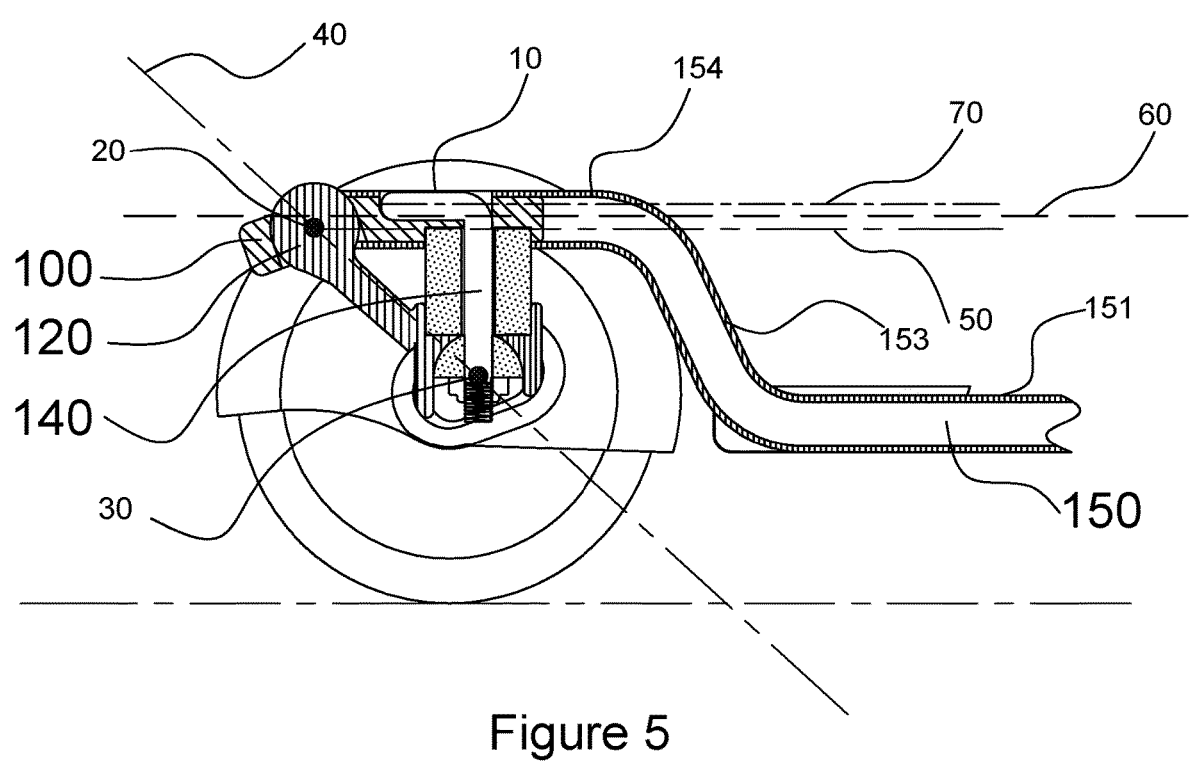

FIG. 5 shows a side section kinematic diagram view of the truck of an embodiment of the present invention mounted within a horizontal end portion of the tubular frame of a skateboard.

Figure 6:
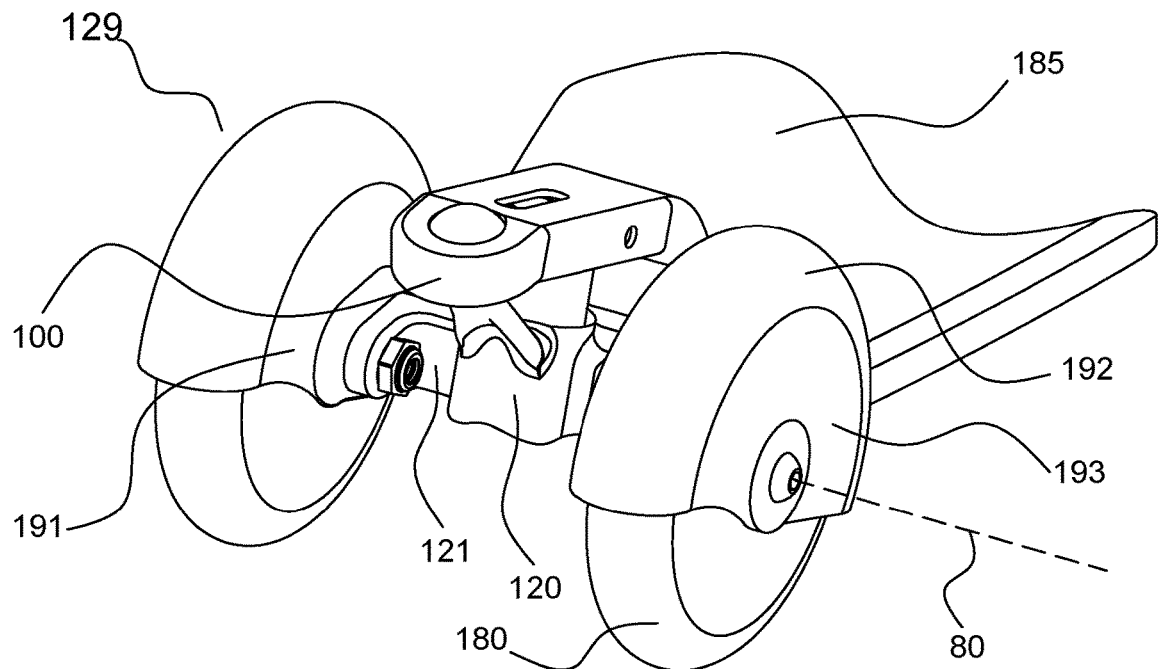

FIG. 6 shows an assembled perspective view of a front or rear truck of an embodiment of the present invention mounted to a skateboard.

Figure 7:
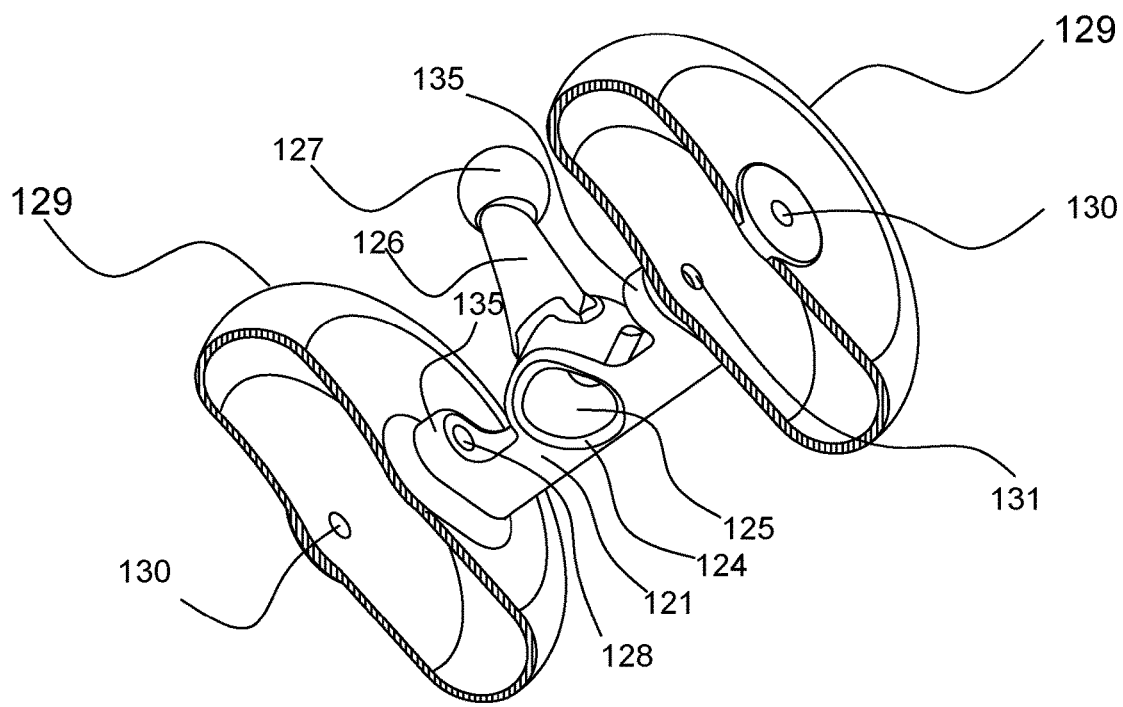

FIG. 7 shows a front perspective view of the bottom of the hanger of an embodiment of the present invention.

Figure 8:
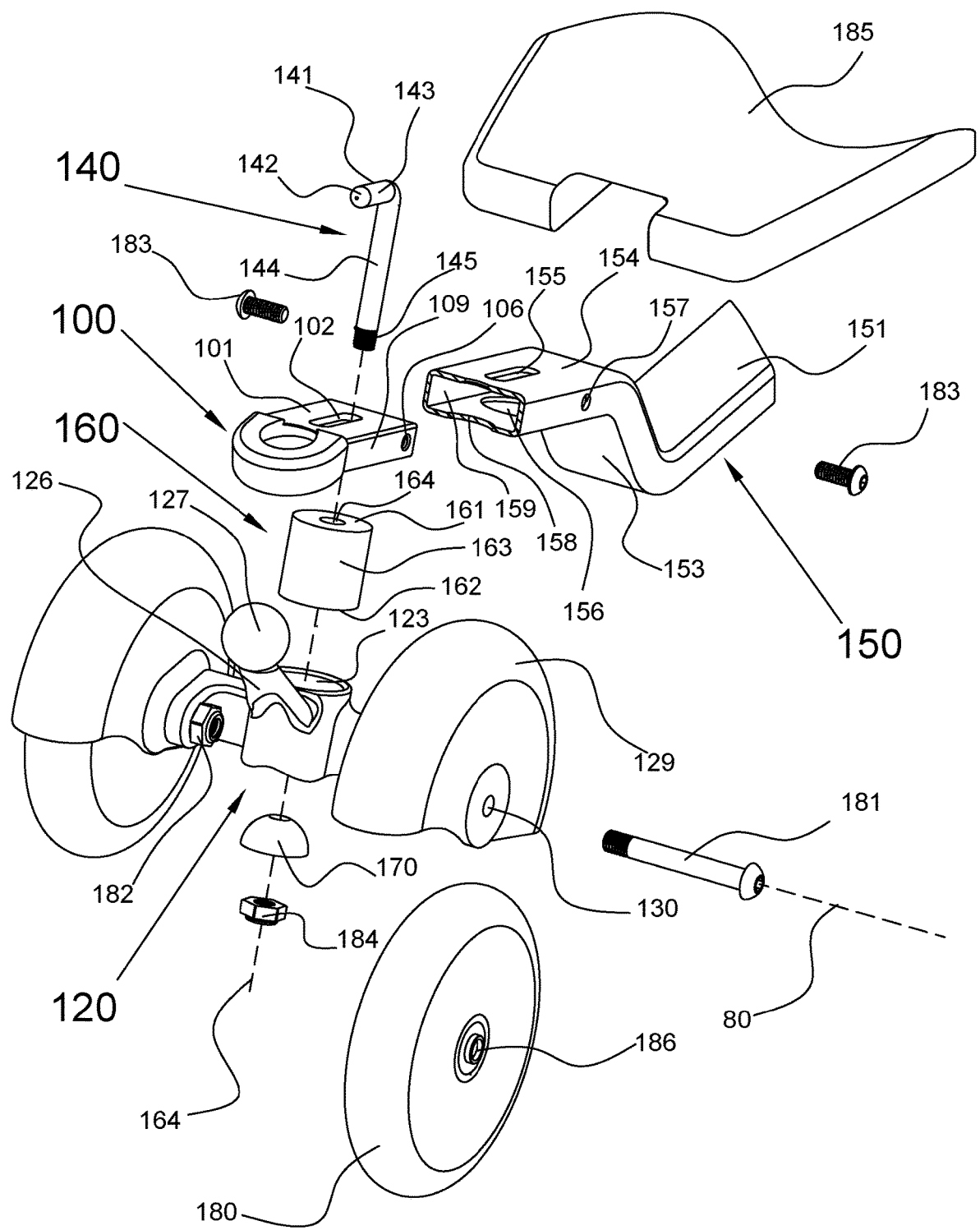

FIG. 8 shows an exploded front perspective view of an embodiment of the truck of the present invention.

Figure 9:
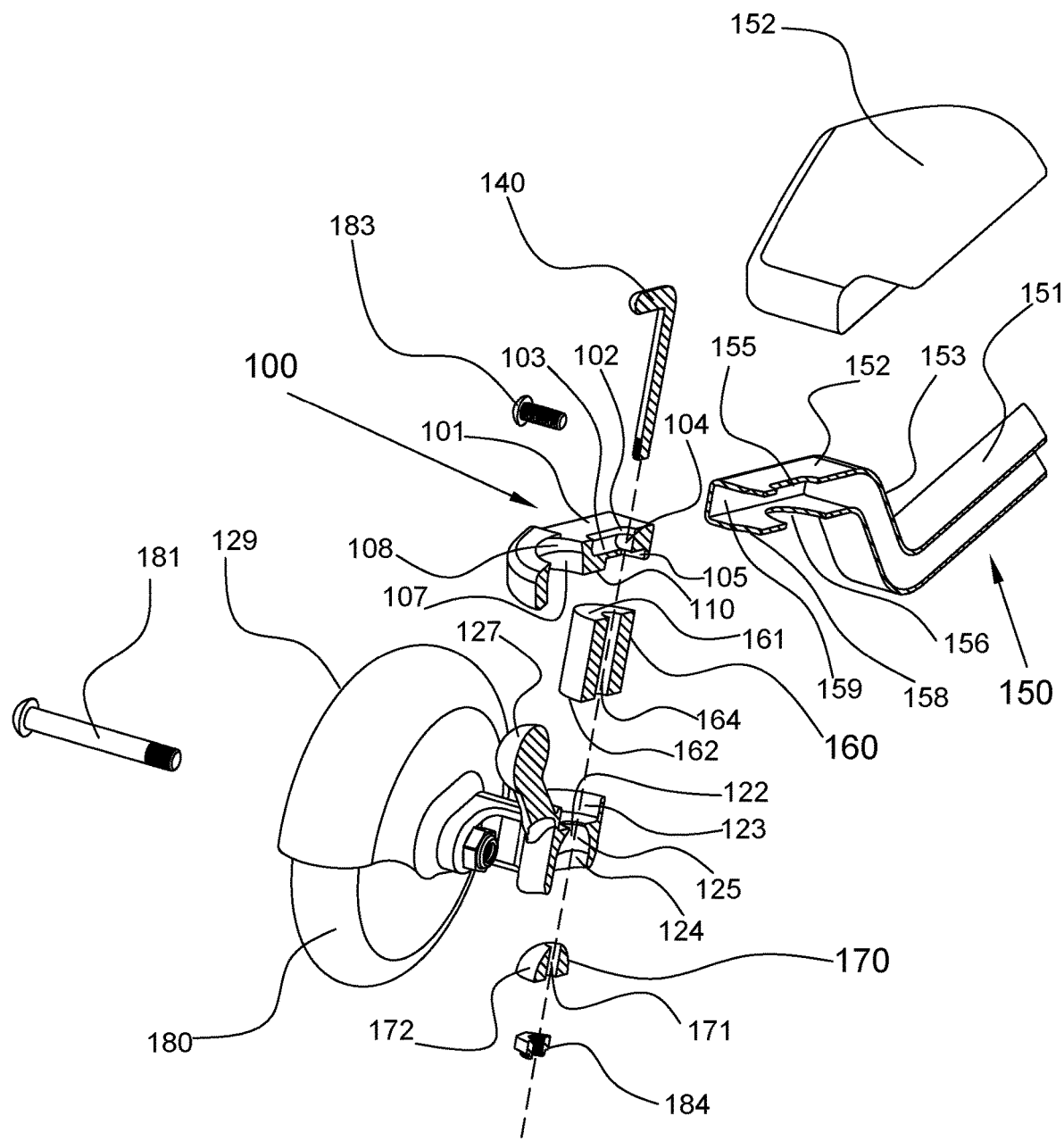

FIG. 9 shows an exploded section perspective view of an embodiment of the truck of the present invention.

Figure 10:
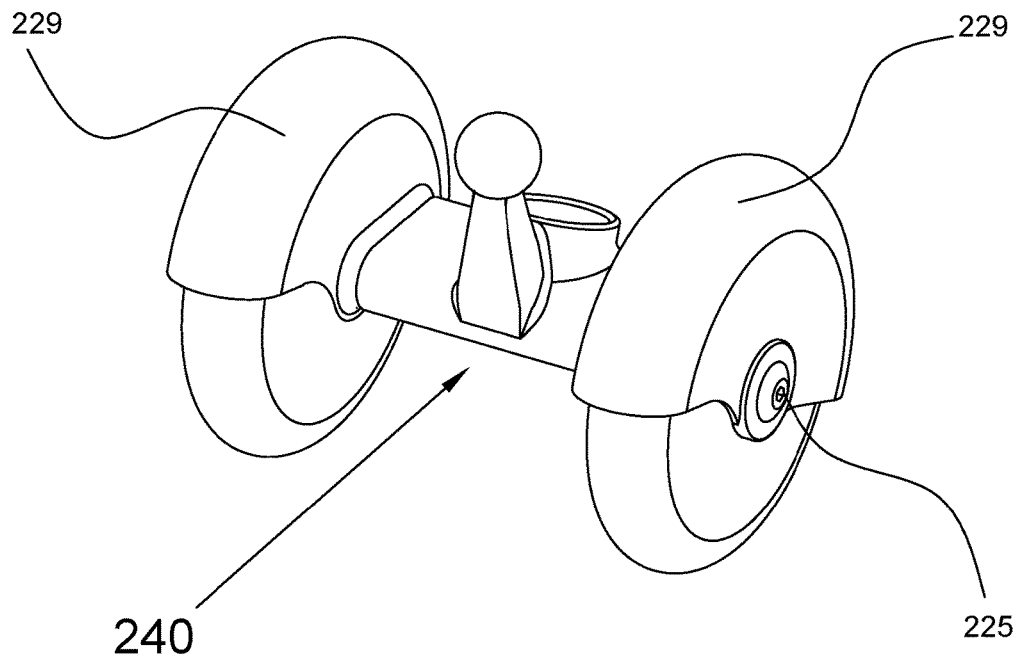

FIG. 10 shows an assembled perspective view of an embodiment of the hanger and wheels of the present invention with bolt on fenders and a single axle.

Figure 11:
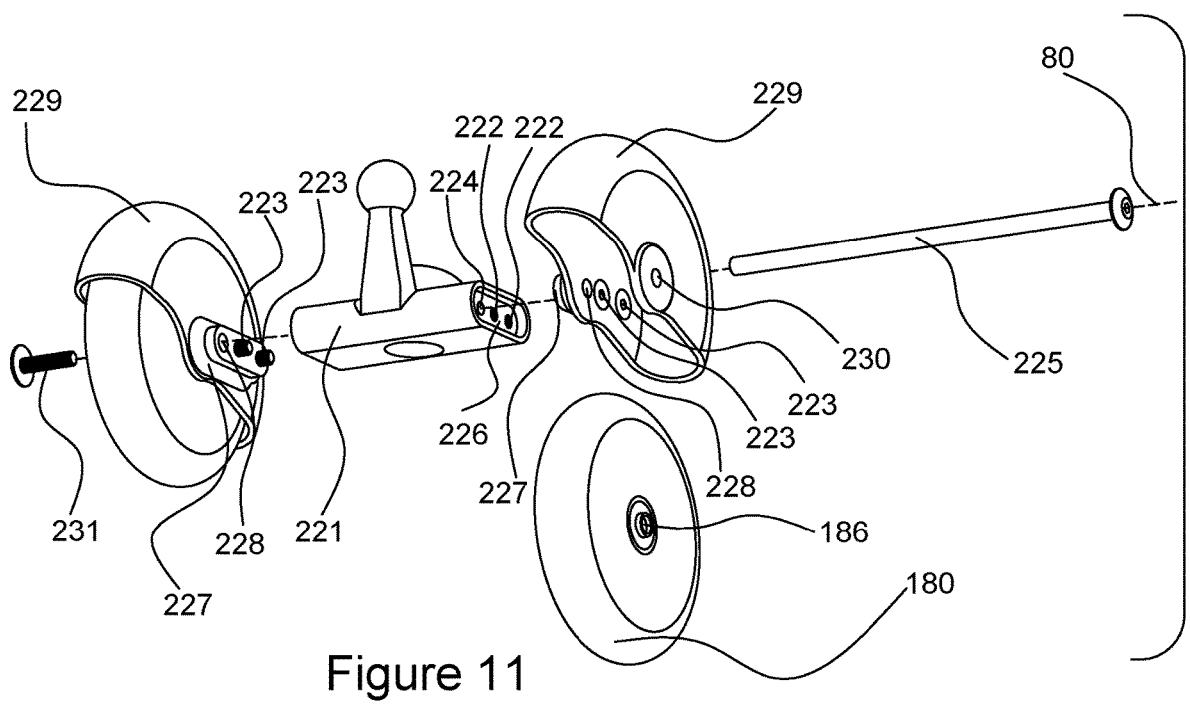

FIG. 11 shows an exploded perspective view of an embodiment of the hanger and wheels of the present invention with bolt on fenders and a single axle.

Figure 12:
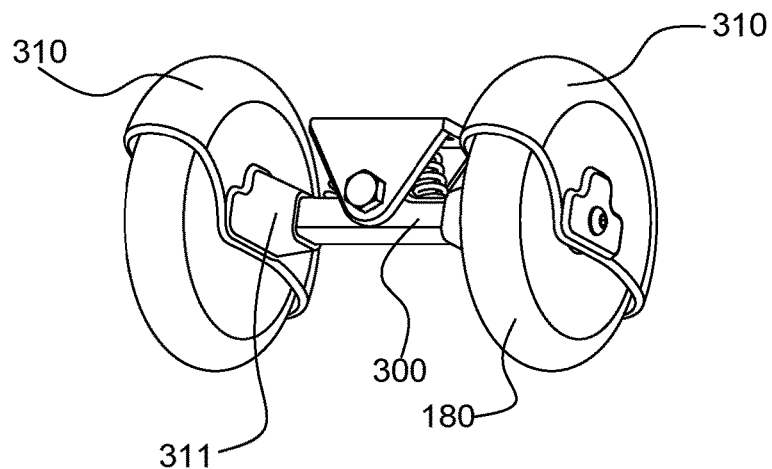

FIG. 12 shows an assembled perspective view of a double spring truck of prior art with an embodiment of the structural fenders of the present invention.

Figure 13:
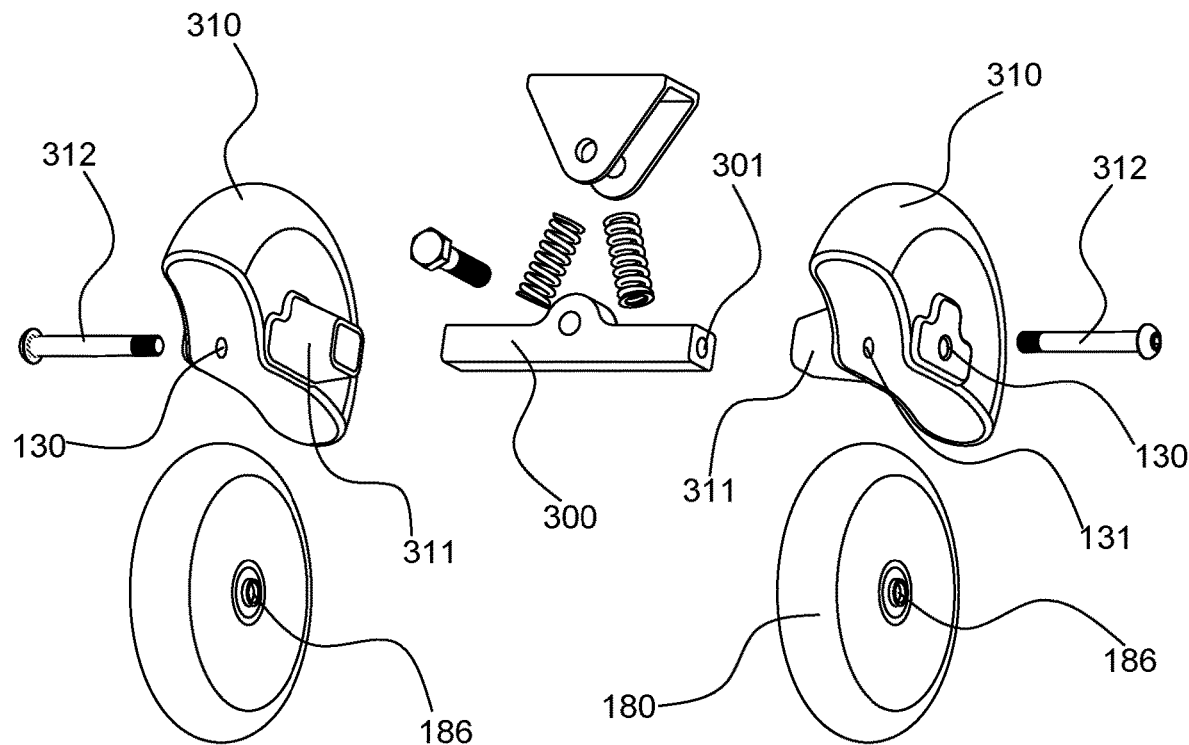

FIG. 13 shows an exploded perspective view the ends of the hanger of a double spring truck of prior art contained within a boss of the structural fenders of the present invention.

Figure 14:
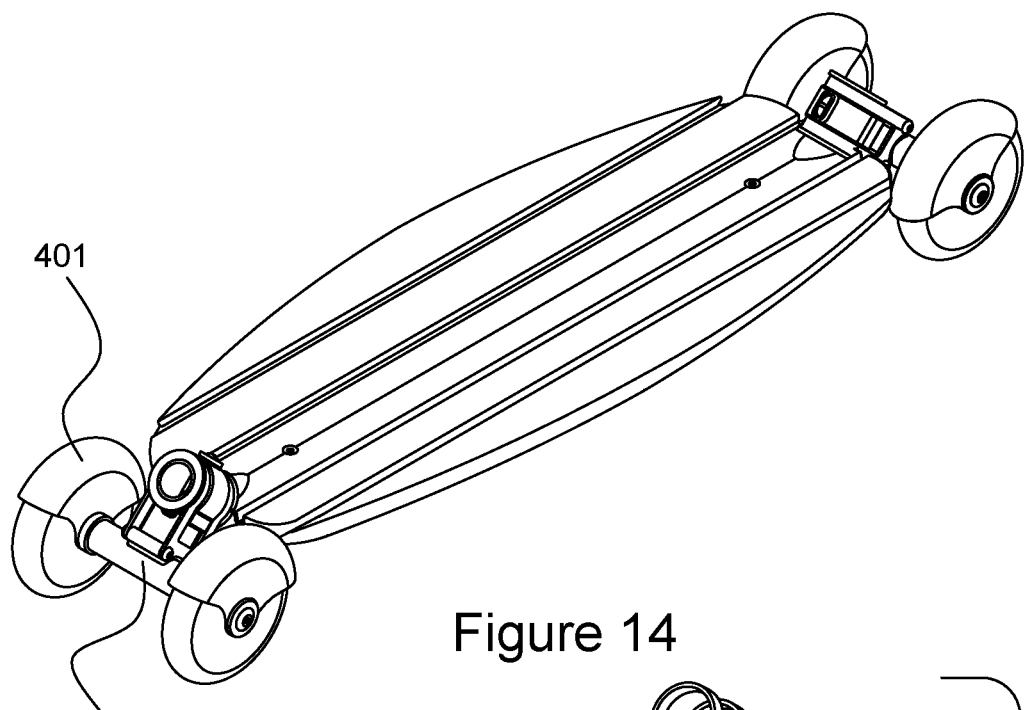

FIG. 14 shows trucks of prior art mounted symmetrically to the frame of a skateboard with the structural fenders of an embodiment of the present invention.

Figure 15:
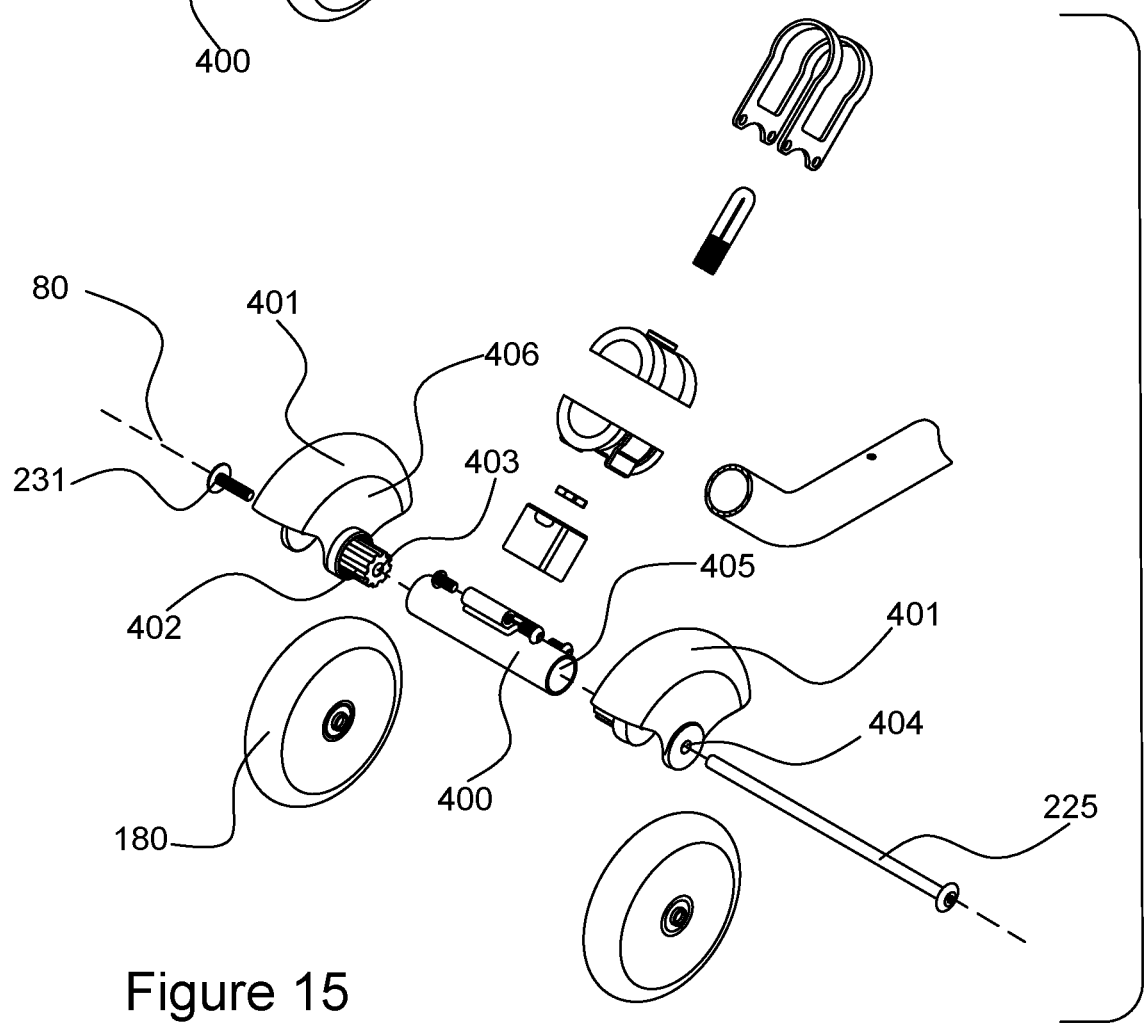

FIG. 15 shows the structural fenders of an embodiment of the present invention with bosses to be contained within the ends of the tubular hangers of trucks of prior art.

DETAILED DESCRIPTION OF THE INVENTION

Specific exemplary embodiments of the invention are illustrated in the figures and described herein. However, the invention may be embodied in many different forms and should not be construed as limited to these exemplary embodiments. Unless specifically noted, articles depicted in the drawings are not necessarily drawn to scale.

It will be understood that although the terms "first" and "second" are used herein to describe various elements, these elements should not be limited by these terms. These terms are used only to distinguish one element from another element.

FIGS. 1-9 show structural fenders 129 in a further embodiment of the lean steering spatial mechanism as described in the Revolute Floating Kingpin Truck for a Riding Device, U.S. patent application Ser. No. 16/405,730. The present invention comprises a closed kinematic chain comprised of three rigid bodies and one compliant body with four primary motions, leaning, steering, floating, and suspension.

FIGS. 10 and 11 show the structural fenders connected with a different hanger embodiment than shown in FIGS. 1-9. FIGS. 12 and 13 show the structural fenders connected with a truck of the prior art. FIGS. 14 and 15 show the structural fenders connected with yet another hanger embodiment.

In preferred embodiments, each truck has a left side structural fender and a right side structural fender. The left side structural fender connects with a first end of the horizontal hanger member, and the right side structural fender connects with a second end of the horizontal hanger member. Each structural fender 129 is comprised of an inner side wall 191, and outer side wall 193 and an arcuate surface 192 connecting the two side walls. Inner side wall 191 is proximal to the truck and outer side wall 193 is distal to the truck. Inner side wall 191 is connected with the arcuate surface 192 which is connected with outside side wall 193. The connection between the inner side wall 191 and outer side wall 193 is preferably curved or arcuate, to closely surround and correspond to the curved outside surface of each wheel. However, the connection between the inner and outer side walls may be any shape as needed to connect inner and outer surfaces while covering the top of the wheel.

The inner side wall 191, the arcuate surface 192, and the outer side wall 193 of each structural fender preferably cover the upper portion of the wheel leaving exposed a bottom portion of the wheel allowing the wheel to touch the riding surface. Both the inner side wall and the outer side wall of each structural fender must cover the wheel axle bore to accommodate the inner and outer transverse side wall bores.

The structural fenders are comprised of a material with sufficient strength to support a wheel axle of a wheel that supports the weight of the rider or object on the riding device. The structural fender itself provides the structural support to each wheel axle, without the need for a fork. Each structural fender allows each wheel to rotate about the axle while still supporting the weight of objects or persons on the deck of the riding device.

Figure 1:
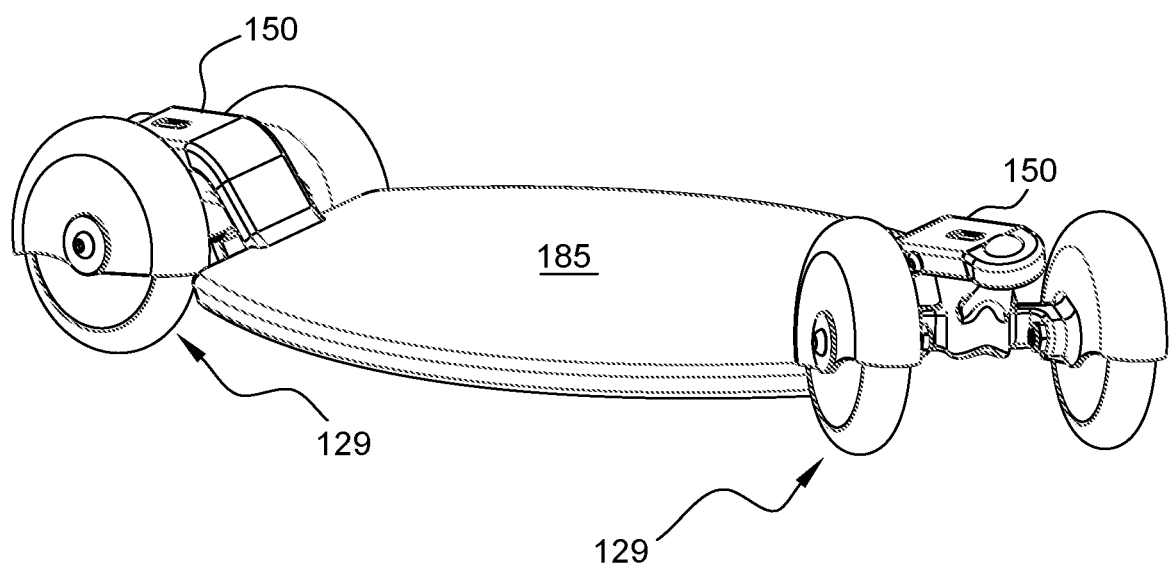
FIG. 1 shows two trucks of an embodiment of the present invention mounted symmetrically to the front and back of a skateboard, moving left, leaning left and steering left.
Figure 2:
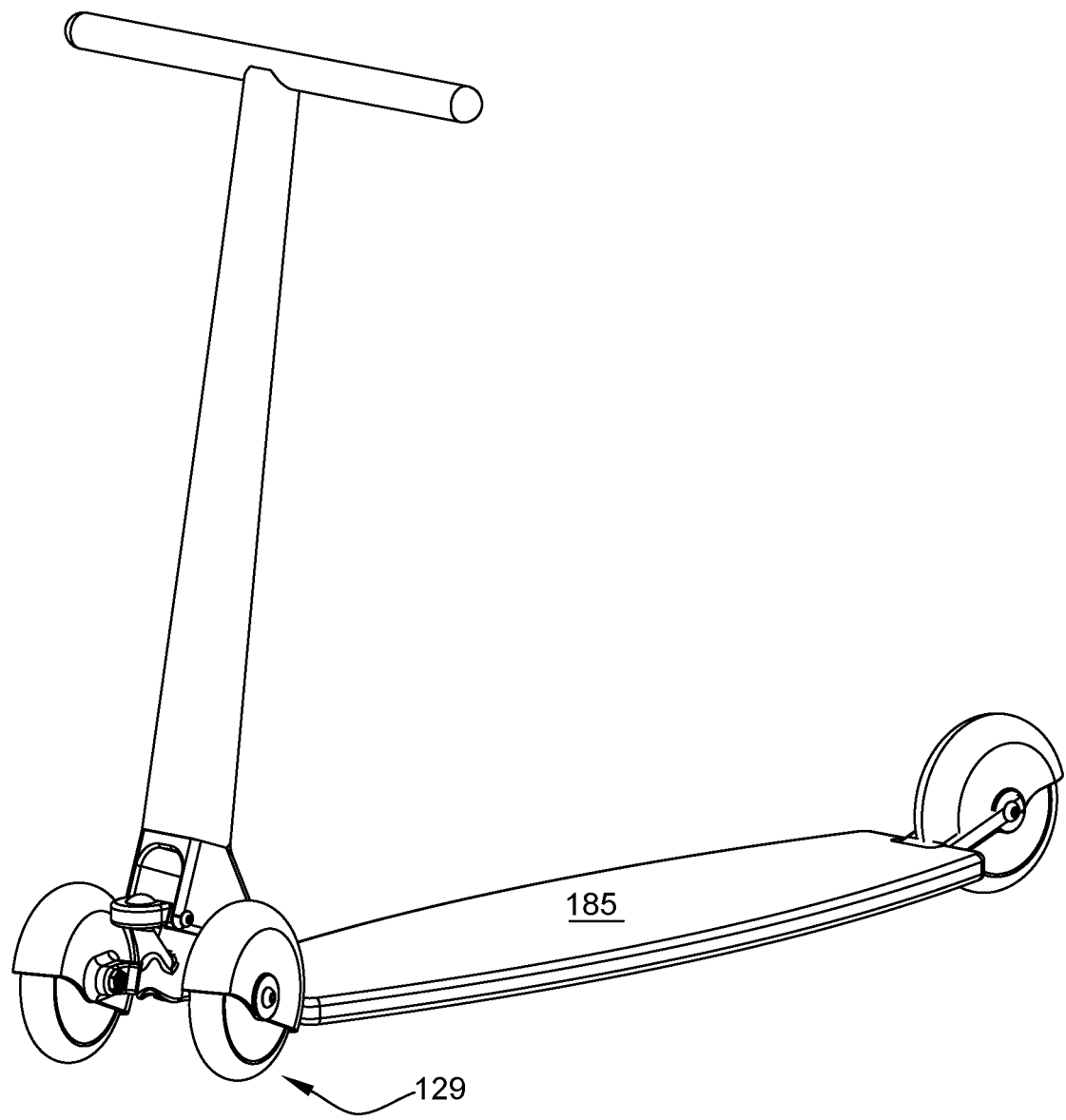
FIG. 2 shows the truck of an embodiment of the present invention mounted to the front of a three wheeled scooter typically referred to as a "kickboard", leaning slightly left and steering left.

In preferred embodiments, there are two laterally-spaced structural fenders covering two laterally-spaced wheels. Non-limiting examples are shown in FIGS. 1-3. The two laterally-spaced structural fenders may be connected by a horizontal hanger member 121, where a first or left side structural fender securely connects with a first end of the horizontal hanger member and covers a left side wheel, and a second or right side structural fender securely connects with a second end of the horizontal hanger member and covers a right side wheel. Each structural fender surrounds and supports one wheel. There may be a single axle that goes through both wheels (see e.g., FIGS. 11 and 15) or there may be one axle for each wheel (see e.g., FIGS. 6, 8, and 13). Each structural fender may be securely connected with the hanger by any means known in the art. Some non-limiting examples of secure connections between a structural fender and a hanger are shown in FIGS. 6-15.

In preferred embodiments, each structural fender covers the upper portion of the associated wheel, covering approximately one-half of the wheel. However, the size of the structural fender may be varied as needed or desired. As a non-limiting example, the structural fender could cover the outer circumference of almost the entire wheel, leaving exposed only the portion of the wheel that is in contact with the riding surface. This would provide a largest fender, with greater protection from something touching the wheel. In other embodiments, as shown in FIG. 8, the side walls may cover approximately one half of the wheel. In still other embodiments the side walls may cover less than one half of the wheel, while still covering the wheel axle bores, and providing sufficient structural support for the associated wheel of the riding device.

In all shapes and sizes of a structural fender, there is one transverse bore 131 disposed in inner side wall 191 of the structural fender and one transverse bore 130 disposed in outer side wall 193 of the structural fender. The transverse bores are concentric with each other so that the axle may be positioned along the axle axis 80 and run through outer bore 130, through wheel axle bore of wheel 180, and through inner bore 131. The wheel axle may be moveably secured to the structural fender by any means known in the art.

In some embodiments, for example FIGS. 6 and 7, each wheel may have an axle and the axle may be secured by a nut 182. In these embodiments the horizontal hanger member may have a first flange 135 on the left side and a second flange 135 on the right side. A left side axle bore 128 is disposed within the first flange and a right side axle bore 128 is disposed within the second flange, as shown in FIG. 7.

A first axle 181 is disposed along the axle axis 80 through the outer transverse bore 130 in the outer side wall of the left structural fender, through the first wheel axle bore 186, through the inner transverse bore 131 in the inner side wall of the left structural fender, and through the left side axle bore 128 in the first flange 135 of the horizontal member 121, and is secured to the first flange. A second axle 181 is disposed along the axle axis 80 through the outer transverse bore 130 in the outer side wall of the right structural fender, through the second wheel axle bore, through the inner transverse bore 131 in the inner side wall of the right side structural fender, and through the right side axle bore 128 in the second flange 135 in the second end of the horizontal member, and is secured to the second flange.

FIGS. 6 and 8 show nuts 182 tightened against the first and second flanges to secure each axle 181. Alternatively, a nut may be tightened against outer side wall 193, or there may be two nuts, one tightening against the flange and one tightening against outer side wall 193 to secure axle 181, or axle 181 may be secured by any means known in the art.

In some embodiments, for example FIG. 11, a single wheel axle 225 may go through two laterally spaced wheels, and may be secured using any means know in the art. In these embodiments, the horizontal hanger member 221 has one transverse through bore 224 sized to receive the single wheel axle that extends from the first end of the horizontal hanger member to the second end of the horizontal hanger member. As shown in FIG. 11, single wheel axle 225 is securely disposed along the axle axis 80 and through the outer transverse bore 230 in the outer side wall of the left structural fender, through the left wheel axle bore 186, through the inner transverse bore 228 in the inner side wall of the left structural fender, through transverse bore 224 in horizontal hanger member 221, through inner transverse bore 228 in the inner side wall of the right structural fender, through the right wheel axle bore 186, and through the outer transverse bore 230 in the outer side wall of the right structural fender, where the axle may be secured by axle fixing screw 231. FIG. 15 shows another embodiment using single wheel axle 225, going through a first outer side wall transverse bore 404, first inner side wall transverse bore 403, hanger bore 405, second inner side wall transverse bore 403, and second outer side wall transverse bore 404.

In all embodiments, each structural fender protects the associated wheel from inadvertently being touched while simultaneously providing structural support for the wheel axle and wheel so that the riding device can carry the weight of a rider, or an object, or both.

Second Embodiment

FIGS. 10 and 11 show a second embodiment of the structural hanger assembly of the present invention. A first rigid body comprises a central horizontal member 221, a right structural fender 229, a symmetrically identical left structural fender 229, and a single wheel axle 225 that runs through both the left side wheel 180 and the right side wheel 180. The three components are connected by structural fender mounting screws 223 to become a single rigid body comprising hanger assembly 240. Each structural fender 229 supports the single wheel axle 225 of each of the laterally-spaced wheels 180.

Hanger assembly 240 is interchangeable with, and has the same kinematic design as hanger 120. Hanger assembly 240 may be comprised of a horizontal member 221 with a first end and a second end. Horizontal hanger member 221 has transverse threaded holes 222 laterally positioned on each side of horizontal member 221 to receive and connect in threaded engagement with structural fender mounting screws 223. The first end of horizontal hanger member has a first recess 226 with at least one threaded hole 222 to connect in threaded connection with at least one mounting screw 223. The second end of horizontal hanger member has a second recess 226 with at least one threaded hole 222 to connect in threaded connection with at least one mounting screw 223.

A transverse through bore 224 is disposed within horizontal member 221 and runs from the first end of horizontal member 221 to the second end of horizontal member 221. Through bore 224 receives and supports single wheel axle 225. In a preferred embodiment, the first recess 226 on the first end of horizontal member 221 receives and mates with a first male boss 227 on the left side structural fender 229, and the second recess 226 on the second end of horizontal member 221 receives and mates with a second male boss 227 on the right side structural fender 229. Other means know in the art may be used to connect horizontal member 221 with the structural fenders 229.

Left and right structural fender 229 each are comprised of male boss 227 with inside transverse bore 228 and outside transverse bore 230. Transverse through bore 224 of horizontal member 221, each inside transverse bore 228, and each outside transverse bore 230 of the laterally spaced right and left structural fenders 129 are all concentric, and disposed along axle axis 80.

In preferred embodiments, hanger assembly 240 comprises male boss 227 of the left (or first) structural fender 229 press fit within hanger recesses 226 on the left (or first) side of horizontal hanger member 221, and the right (or second) structural fender 229 is press fit within hanger recesses 226 on the right (or second) side of horizontal hanger member 221. Structural fender mounting screws 223 securely connect each structural fender with the corresponding side of horizontal hanger member 221. Single wheel axle 225 is disposed along the axle axis 80 through the outer transverse bore 230 in the outer side wall of the left structural fender 229, through the first wheel axle bore 186, through the inner transverse bore 228 in the first male boss 227 of the left structural fender, through the axle bore 224 of the horizontal member 121, through the inner transverse bore 228 in the second male boss 227 of the right structural fender, through the second wheel axle bore 186, and out through the outer transverse bore in the outer side wall of the right structural fender, and is secured so that the wheels rotate. Wheel axle 225 may secured by wheel axle fixing screw 231 or by a wheel axle nut or by push-on axle hat nuts, crimping, cross pins other means known in the art. So assembled, single wheel axle 225 is supported on each side of each wheel.

Third Embodiment

FIGS. 12 and 13 show the double spring truck of prior art and an embodiment of the structural fenders 310 of the present invention. Hanger 300 has a a first end and a second end, with left side threaded axle bore 301 in the first end, and a right side threaded axle bore in the second end. Each axle 312 has a threaded end that securely threads into and connects with each threaded axle bore 301.

In this embodiment structural fenders 310 have a male boss in the form of a structural sleeve 311 that contains and receives an end of prior art hanger 300 so that a left side structural sleeve 311 connects with the first end of the prior art hanger 300 and a right side structural sleeve 311 connects with the second end of the prior art hanger 300.

The inner transverse bore 131 in the inner side wall of the left structural fender is disposed within the first sleeve 311, and the inner transverse bore 131 in the inner side wall of the right structural fender is disposed within the second sleeve 311.

Each structural sleeve 311 may be connected to the corresponding end of hanger 300 of prior art by means of external press fit, adhesive, welding, interlocking features or other means known in the art wherein the hanger 300 and right and left structural fenders 310 become a single rigid body. So assembled, each wheel 180 may be mounted within a structural fender 310 with wheel axle bolt 312. Hanger 300 may have threaded hanger axle bore 301 on the first end to receive and secure the threaded ends of the left side wheel axle bolt 312, and have threaded hanger axle bore 301 on the second end to receive and secure the threaded ends of the right side wheel axle bolt 312 as shown.

Alternatively, hanger 300 may have a through hole similar to transverse through bore 224 so that a single wheel axle 225 may be disposed through the outer transverse bore 130 in the outer side wall of the left structural fender, through the first wheel axle bore 186, through the inner transverse bore 131 in the first sleeve 311 of the left structural fender, through the axle bore of the horizontal member 300, through the inner transverse bore 131 in the second sleeve 311 of the right structural fender, through the second wheel axle bore 186, through the outer transverse bore 130 in the outer side wall of the right structural fender, and may be secured so that the wheels rotate. Axle 225 may secured by wheel axle fixing screw 231 or other means known in the art.

In all cases the wheel bearing axles of the present invention are supported on each side of each wheel.

Fourth Embodiment

FIGS. 14 and 15 show a hollow tubular hanger 400 of another truck design with structural fenders 401 of the present invention. In this embodiment horizontal hanger member is a hollow tube 400 with a first end and a second end, and the hollow tube with a central bore 405 forms the horizontal hanger member. Each structural fender 401 is comprised of a male boss in the form of internal axle bushing 402, a bushing axle bore 403, an outer side wall transverse bore 404, and a single wheel axle 225 secured by wheel axle fixing screw 231, or other means known in the art.

The inner side wall 406 of the left structural fender 401 with a first axle bushing 402 with a first bushing bore 403, is securely disposed within bore 405 of the first end of the tubular hanger 400. The inner side wall of the right structural fender with a second axle bushing 402 with a second bushing axle bore 403, is securely disposed within the second end of the tubular hanger. Axle 225 is disposed along the concentric axle axis 80 defined by left structural fender bore 404, left bushing bore 403, tubular hanger 400 central bore 405, right bushing bore 403, and right structural fender bore 404.

In this embodiment axle bushing 402 of each structural fender 401 is contained within the tubular hanger 400 and connected by means of press fit, adhesive, interlocking features, crimping or other means known in the art such that tubular hanger 400 and right and left structural fenders 401 become a single rigid body. So assembled, laterally positioned wheel assemblies 180 may be mounted by means of a single pass through axle 225 with wheel axle 225 supported by structural fenders 401 on each side of each wheel.

Kinematic Description

The truck of embodiments shown in FIGS. 1-11 is comprised of a first pair of rigid bodies baseplate 100 and revolute floating kingpin 140 connected by revolute joint 10.

A second pair of rigid bodies baseplate 100 and hanger 120 connected by spherical joint 20.

And a third pair of rigid bodies revolute floating kingpin 140 and hanger 120 connected by spherical joint 30.

Compliant body 160 comprises an elastomeric component that completes the closed kinematic chain. The single compliant body 160 of the present invention couples the motions of leaning and steering that would be otherwise be kinematically independent, providing the third primary motion of floating. With wheels constrained by contact with the plane of a riding surface rider input leaning motion of the frame and deck and baseplate 100 compresses the compliant body 160 of the truck that then transfers torque between the rigid bodies resulting in the output motion of steering of the hanger and wheels on the riding surface. The third primary motion of floating is an adjustable range of independence between the motions of leaning and steering wherein torque transferred by compliant body 160 from the motion of leaning is not sufficient to cause steering and vice versa torque transferred up from unwanted wheel movement in response to riding surface conditions (steering) is not sufficient to cause leaning of the frame and deck. Compliant body 160 also couples and constrains the rigid bodies to provide return to center force and to provide the fourth primary motion of load-bearing suspension.

FIGS. 4-5 show hanger pivot axis 40 defined by the centroid points of upper spherical joint 20 and lower spherical joint 30. Rotation of baseplate 100 and hanger 120 relative to each other about hanger pivot axis 40 is a first degree of freedom of the truck of the present invention.

With wheels constrained by the plane of the riding surface rotation of hanger 120 about hanger pivot axis 40 results in the motion of steering.

FIGS. 4-5 show a floating revolute kingpin axis 70 defined by the centroid axis of revolute joint 10. Rotation of baseplate 100 and floating revolute kingpin 140 relative to each other about floating revolute kingpin axis 70 is the second degree of freedom of the truck of the present invention.

FIG. 4 shows a first longitudinal roll axis 50 formed by a virtual line between the centroid point of upper spherical joint 20 of the front truck and the centroid point of upper spherical joint 20 of the rear truck when assembled as a skateboard, or any other riding device with a front and rear truck.

FIG. 5 shows that roll axis 60 is a blended roll axis defined by rotation of axis 70 and longitudinal roll axis 50 about each other. The axis of rotation 70 of revolute joint 10 and longitudinal roll axis 50 may, in some embodiments, be coincident.

In some embodiments, tubular frame 150 has horizontal end member 154. Horizontal end member 154 is generally parallel with the central frame member 151 and deck 185 of the riding device, as shown in FIG. 5. Horizontal end member 154 may be at the front end, rear end, or both ends of the riding device. A non-limiting example of a horizontal parallel end member 154 at both ends of a riding device is shown in FIG. 1.

In other embodiments, the tubular frame comprises angled end member 152, as shown in FIG. 4, where angled end member 152 is angled relative to the central frame member 151 of the riding device. Angled end member 152 may be at the front end, rear end, or both ends of the riding device. A non limiting example of an angled member 152 at the front of a riding device is shown in FIG. 2. A non-limiting example of an angled member 152 at the rear of a riding device is shown in FIG. 3.

Horizontal end member 154 and angled end member 152 are open on the end to receive base plate 100. Thus, the angle of revolute floating king pin 140 and the angle of rotational axis 70 will change as the angle of the end frame varies from generally horizontal to angled. Modifying the angle of end frame member modifies the angle of hanger pivot axis 40 wherein a steeper hanger pivot axis angle results in a faster steering response and a lower hanger pivot axis angle results in slower steering response.

With wheels constrained by the plane of the riding surface rotation of baseplate 100, frame 150 and deck 185 about longitudinal roll axis 50 or 60 results in the motion of leaning.

As shown in FIGS. 1-11, a preferred embodiment of the present invention is a truck comprised of three rigid bodies and a compliant body. A first rigid body is baseplate 100, a second rigid body is hanger 120 with integrated structural fenders, and a third rigid body is floating revolute kingpin 140.

As shown in FIGS. 6-9, baseplate 100 of the present invention is comprised of an outer top surface 101, a top opening 102 to receive the revolute floating kingpin, a revolute floating kingpin bearing cavity 103, a free float chamber 104. The baseplate also has an outer lower surface with a lower recess 105 to receive and accommodate elastomeric component 160, wherein the lower recess further comprises a lower hole to accommodate arm 144 of the revolute floating kingpin, and wherein the lower surface further comprises a lower opening 107 that opens to and connects with a pivot arm spherical bearing cavity 108. Baseplate 100 has a left side surface 109 and a right side surface 109 and at least one threaded hole 106 in at least one side surface. In a preferred embodiment, there is a threaded hole 106 in the left side surface and a threaded hole 106 in a right side surface. Baseplate 100 is securely connected with tubular frame 150 to form a single rigid body. The outer top surface 101, the outer lower surface 110, the left side surface 109, and the right side surface 109 of the baseplate securely connected with and insert into a tubular frame forming a single rigid body.

Hanger 120 of an embodiment of the present invention is comprised of central horizontal member 121 with an upper surface, a lower surface, a first end with a left side transverse axle bore 128 in the left side end of the central horizontal member 121 and a second end with a right side transverse axle bore 128 in the right side end of the central horizontal member 121. Central horizontal member 121 further comprises an upper surface with an upper recess 123 that accommodates and receives the bottom of elastomeric component 160. Central bore 122 is disposed within upper recess 123. Central horizontal member 121 further comprises a bottom surface with a lower opening 124, opening to and connected with hanger spherical bearing cavity 125. Central bore 122, upper recess 123, hanger spherical bearing cavity 125, and lower opening 124 are all concentric. A central pivot arm 126 has male spherical bearing surface 127 on the distal end.

Each integrated structural fender 129 has a transverse bore 131 through the inside surface side of fender 129 and a transverse bore 130 through the outer side of fender 129. Transverse bores 131 and 130 are concentric and define hanger axle axis 80. In some embodiments, transverse bores 131 and 130 work together to support a wheel axle bolt 181 that supports and allows rotation of a single wheel.

Floating revolute kingpin 140 is comprised of an upper arm 141 with a male revolute bearing surface 143 with an end 142, a lower arm 144 with an outside surface and with threads 145 on the lower end. Upper arm 141 and lower arm 144 are connected and are preferably perpendicular to each other.

Frame 150 of an embodiment of the present invention is comprised of central section 151, drop frame sections 153, and either horizontal frame ends 154 or angled frame ends 152 each with interior surface 159. Each frame end has top surface cutout 155, bottom surface cutout 156, formed shape 158 on a bottom distal end, and at least one, or preferably two, transverse bores 157 positioned in the frame end.

Compliant body 160 is an elastomeric component with a top 161, a bottom 162, a side surface 163, and a central bore 164.

Assembly of the truck of an embodiment of the present invention is as follows: Male spherical bearing surface 127 of hanger 120 passes through lower opening 107 of baseplate 100 to mate with spherical bearing cavity 108 of baseplate 100 so that baseplate 100 and hanger 120 are connected by upper spherical joint 20.

As shown in FIGS. 8 and 9, frame end member 152 is open on the end, and baseplate outer surface 101 is received by interior mating surfaces 159 of tubular frame end 152 so that formed shape 158 of frame end 152 retains male spherical bearing surface 127 of hanger 120. Baseplate 100 is partially contained within tubular frame end 152 and may be retained by at least one screw 183, and preferably two screws 183 passing through transverse bores 157, or other means known in the art wherein baseplate 100 and frame 150 kinematically become a single rigid body.

Truck assembly continues as lower arm 144 of floating revolute kingpin 140 passes through frame cutout 155, through top opening 102 of baseplate 100, through revolute bearing cavity 103, through free float chamber 104, and through recess 105 so that male revolute bearing surface 143 and rounded end 142 of upper arm 141 mate with revolute bearing cavity 103 of baseplate 100, wherein baseplate 100 and floating revolute kingpin 140 are connected by means of revolute joint 10. Free float chamber 104 is comprised of an oval shaped bore that allows both rotation of upper arm 141 and swinging of lower arm 144.

Lower arm 144 of floating revolute kingpin 140 further passes through opening 156 of frame member 152, through central bore 164 of compliant body 160, through recess 123, central bore 122, spherical bearing cavity 125, and bottom access bore 124 of the hanger 120, through central bore 171 of hemispheric bearing 170 and threads into kingpin nut 184. Tightening kingpin nut 184 onto threads 145 of floating revolute kingpin 140 movably constrains male spherical bearing surface 172 of hemispheric bearing 170 with spherical bearing cavity 125 of hanger 120 and constrains top 161 of compliant body 160 with recess 105 of baseplate 100 and bottom 162 of compliant body 160 with recess 123 of hanger 120 wherein hanger 120 and floating revolute kingpin 140 are connected by means of elastomerically constrained lower spherical joint 30.

Compliant body 160 in the form of an elastomeric bushing contains lower arm 144 of floating revolute kingpin 140 within a central bore 164 and is sandwiched between recess 105 of baseplate 100 and recess 123 of hanger 120. Tightening kingpin nut 184 preloads compliant body 160 and completes assembly. So connected compliant body 160 couples and constrains the motion of the rigid bodies of baseplate 100 and frame 150, hanger 120, and floating revolute kingpin 140 such that rider input motion leaning the deck 185 produces torque that is transferred by means of compliant body 160 between the three rigid bodies of baseplate 100, hanger 120, and floating kingpin 140 to produce the motion of steering of the wheels constrained by the surface of the ground.

One wheel assembly 180 is received within a structural fender 129 on each side of hanger 120. Wheel axle bolt 181 passes through outside transverse bore 130, through the central bore 186 of wheel assembly 180, and through inside transverse bore 128. Wheel axle bolt 181 is secured by wheel axle nut 182 or by push-on axle hat nuts, crimping, cross pins or by any other means known in the art. So assembled, each structural fender 129 covers and surrounds each side of a wheel assembly 180 so that structural fender 129 supports wheel axle bolts 181 on each side of each wheel.

In further preferred embodiments trucks of the present invention may be mounted to the frame of a skateboard or scooter or other lean steering riding devices.

The above description presents the best mode contemplated in carrying out the invention(s) described herein. However, it is susceptible to modifications and alternate constructions from the embodiments shown in the figures and accompanying description. Consequently, it is not intended that the invention be limited to the particular embodiments disclosed. On the contrary, the invention is intended to cover all modifications, sizes and alternate constructions falling within the spirit and scope of embodiments of the invention.

What is claimed is:

1. A structural fender for a riding device comprising:
a truck with a hanger comprising a horizontal hanger member with a first end and second end;
a first wheel axle and a second wheel axle;
a left side structural fender securely connected with the first end of the horizontal hanger member and a right side structural fender securely connected with the second end of the horizontal hanger member wherein the left side structural fender covers a left side wheel with a first wheel axle bore, and the right side structural fender covers a right side wheel with a second wheel axle bore, and wherein each wheel axle bore is disposed along an axle axis, and is sized to receive a wheel axle,
the left structural fender comprises an inner side wall connected with an arcuate surface connected with an outer side wall, wherein the arcuate surface corresponds to an outside curved surface of the left side wheel and leaves exposed a bottom portion of the left side wheel allowing the left side wheel to touch a riding surface;
the right the left structural fender comprises an inner side wall connected with an arcuate surface connected with an outer side wall, wherein the arcuate surface corresponds to an outside curved surface of the right side wheel and leaves exposed a bottom portion of the right side wheel allowing the right side wheel to touch a riding surface;
the first axle is disposed along the axle axis through the outer transverse bore in the outer side wall of the left structural fender, through the first wheel axle bore in the left wheel, through the inner transverse bore in the inner side wall of the left structural fender and connects with the first end of the horizontal member,
the second axle is disposed along the axle axis through the outer transverse bore in the outer side wall of the right structural fender, through the second wheel axle bore in the right wheel, through the inner transverse bore in the inner side wall of the right side structural fender, and connects with the second end of the horizontal member;
wherein the inner transverse bores and the outer transverse bores are all concentric and sized to receive each wheel axle, and wherein each wheel axle is secured to the structural fender so that the wheel rotates within the structural fender;
wherein each structural fender is comprised of a material of sufficient strength to support the wheel axle; and
wherein the structural fender and hanger comprise a single rigid body.

2. A structural fender of claim 1 wherein
the horizontal hanger member further comprises a left side axle bore in a first flange in the first end of the horizontal hanger member and a right side axle bore in a second flange in the second end of the horizontal hanger member;
the first axle is disposed along the axle axis through the outer transverse bore in the outer side wall of the left structural fender, through the first wheel axle bore, through the inner transverse bore in the inner side wall of the left structural fender, and through the left side axle bore in the first flange of the horizontal member, and is secured to the first flange;
the second axle is disposed along the axle axis through the outer transverse bore in the outer side wall of the right structural fender, through the second wheel axle bore, through the inner transverse bore in the inner side wall of the right side structural fender, and through the right side axle bore in the second flange of the horizontal member, and is secured to the second flange.

3. The structural fender of claim 1 wherein the left structural fender further comprises
the horizontal hanger member with a left side axle bore in the first end and a right side axle bore in the second end;
a first sleeve securely connected with the inner side wall of the left structural fender wherein the inner transverse bore in the inner side wall of the left structural fender is disposed within the first sleeve, and the first end of the horizontal hanger member is received within the first sleeve;
a second sleeve securely connected with the inner side wall of the right structural fender wherein the inner transverse bore in the inner side wall of the right structural fender is disposed within the second sleeve, and the second end of the horizontal hanger member is received within the second sleeve; and
the first axle is disposed along the axle axis through the outer transverse bore in the outer side wall of the left structural fender, through the first wheel axle bore, through the inner transverse bore in the first sleeve of the left structural fender and is securely connected with the left side axle bore of the horizontal member;
the second axle is disposed along the axle axis through the outer transverse bore in the outer side wall of the right structural fender, through the second wheel axle bore, through the inner transverse bore in the second sleeve of the right structural fender and is securely connected with the right side axle bore of the horizontal member.

4. The structural hanger of claim 3 wherein the first axle has a threaded end that securely threads into and connects with the left side axle bore in the horizontal hanger member, and the second axle has a threaded end that securely threads into and connects with the right side axle bore in the horizontal hanger member.

5. The structural fender of claim 1 connected with a truck for a riding device comprising,
a baseplate comprising an outer top surface with a top opening that opens to a revolute floating kingpin bearing cavity that connects with a free float chamber, an outer lower surface with a lower recess to receive a compliant body, a lower opening connected with a pivot arm spherical bearing cavity to receive a pivot arm, a right side surface, a left side surface, wherein the outer top surface, the outer lower surface, the left side surface, and the right side surface of the baseplate securely connect with and insert into a tubular frame forming a first rigid body;
the hanger further comprises a central horizontal member with an upper surface, a lower surface, and a pivot arm with a male spherical bearing surface on a distal end, wherein the upper surface comprises an upper recess and a central bore disposed within the upper recess, and wherein the bottom surface comprises a lower opening connected with a hanger spherical bearing cavity, and wherein the upper recess, central bore, hanger spherical bearing cavity, and the lower opening are concentric, wherein the left wheel and left structural fender are connected with the first end of the horizontal member and the right wheel and right structural fender are connected with the second end of the horizontal member, and wherein the hanger and structural fender comprise a second rigid body;
a revolute floating kingpin comprising an upper arm with a male bearing surface and an end, and a lower arm with an outside surface and an end with threads that passes through a hemispheric bearing and is secured by a nut, wherein the upper arm and the lower arm are connected and are perpendicular to each other;
the compliant body comprising an elastomeric component with a top, a bottom, a circular side surface, and a central bore that is sized to receive and moveably secure an outside surface of the lower arm of the revolute floating king pin and comprising a third rigid body;
an upper spherical joint moveably connecting the hanger pivot arm male bearing surface with the baseplate pivot arm spherical bearing cavity;
a lower spherical joint moveably connecting the hanger with the lower arm of the revolute floating kingpin;
a revolute joint moveably connecting the upper arm of the revolute floating kingpin with the baseplate, wherein a free float chamber and lower recess define the range of rotation of the revolute floating kingpin relative to the baseplate; and
a hanger pivot axis between a centroid point of the upper spherical joint and a centroid point of the lower spherical joint.

6. A structural fender for a riding device comprising:
a truck with a hanger comprising a horizontal hanger member with a first end, a second end, and a transverse through bore disposed along an axle axis;
one wheel axle;
a left side structural fender securely connected with the first end of the horizontal hanger member, and the left side structural fender covers a left side wheel with a first axle bore disposed along the axle axis,
a right side structural fender securely connected with the second end of the horizontal hanger member, and a right side structural fender covers a right side wheel with a second axle bore along the axle axis,
the left side structural fender comprising an inner side wall connected with an arcuate surface connected with an outer side wall, wherein the arcuate surface corresponds to an outside curved surface of the left side wheel and leaves exposed a bottom portion of the left wheel allowing the left wheel to touch a riding surface;
the right side structural fender comprising an inner side wall connected with an arcuate surface connected with an outer side wall, wherein the arcuate surface corresponds to an outside curved surface of the right side wheel and leaves exposed a bottom portion of the right wheel allowing the right wheel to touch a riding surface;

the axle is disposed along the axle axis through the outer transverse bore in the outer side wall of the left structural fender, through the first wheel axle bore, through the inner transverse bore in the inner side wall of the left structural fender, through the transverse bore in the horizontal hanger member, through the inner transverse bore in the inner side wall of the right structural fender, through the second wheel axle bore, and through the outer transverse bore in the outer side wall of the right structural fender;

wherein the inner transverse bores and the outer transverse bores are concentric and are sized to receive the wheel axle, and wherein the wheel axle is secured to the structural fender so that each wheel rotates within each structural fender;

wherein the wheel bearing axle is supported by the inner side wall and outer side wall on each side of each wheel;

wherein each structural fender is comprised of a material of sufficient strength to support the wheel axle; and wherein the structural fender and hanger comprise a single rigid body.

7. The structural fender of claim 6 wherein the horizontal hanger member is a hollow tube with a first end and a second end, and the tube forms the horizontal hanger member through bore;

the inner side wall of the left structural fender is connected with a first axle bushing with a first bushing axle bore, and the first axle bushing is securely disposed within the first end of the tube;

the inner side wall of the right structural fender is connected with a second axle bushing with a second bushing axle bore, and the second axle bushing is securely disposed within the second end of the tube;

the axle is disposed along the axle axis through the left structural fender, the first bushing bore, the tubular hanger, the second bushing bore, and the right structural fender.

8. The structural fender of claim 6 wherein the horizontal hanger member comprises an axle bore;

a first sleeve securely connected with the inner side wall of the left structural fender, wherein the inner transverse bore in the inner side wall of the left structural fender is disposed within the first sleeve, and the first end of the horizontal hanger member is securely received within the first sleeve;

a second sleeve securely connected with the inner side wall of the right structural fender wherein the inner transverse bore in the inner side wall of the right structural fender is disposed within the second sleeve, and the second end of the horizontal hanger member is received within the second sleeve;

the axle is disposed along the axle axis through the outer transverse bore in the outer side wall of the left structural fender, through the first wheel axle bore, through the inner transverse bore in the first sleeve of the left structural fender, through the axle bore of the horizontal member, through the inner transverse bore in the second sleeve of the right structural fender, through the second wheel axle bore, through the outer transverse bore in the outer side wall of the right structural fender, and is secured so that the wheels rotate.

9. The structural fender of claim 6 wherein, the first end of the horizontal hanger member has a first recess sized to receive and securely mate with a first male boss on the inside side wall of the left structural fender;

the second end of the horizontal hanger member has a second recess sized to receive and mate with a second male boss on the inside side wall of the right structural fender; and the axle is disposed along the axle axis through the outer transverse bore in the outer side wall of the left structural fender, through the first wheel axle bore, through the inner transverse bore in the first male boss of the left structural fender, through the axle bore of the horizontal member, through the inner transverse bore in the second male boss of the right structural fender, through the second wheel axle bore, through the outer transverse bore in the outer side wall of the right structural fender, and is secured so that the wheels rotate.

10. The structural fender of claim 9 wherein the first recess has at least one threaded hole to connect with at least one left-side structural fender mounting screw, and the second recess has at least one threaded hole to connect with at least one threaded hole right-side structural fender mounting screw.

11. A truck for a riding device comprising, three rigid bodies comprising;

a baseplate comprising an outer top surface with a top opening that opens to a revolute floating kingpin bearing cavity that connects with a free float chamber, an outer lower surface with a lower recess to receive a compliant body, a lower opening connected with a pivot arm spherical bearing cavity to receive a pivot arm, a right side surface, a left side surface, wherein the outer top surface, the outer lower surface, the left side surface, and the right side surface of the baseplate securely connect with and insert into a tubular frame forming a first rigid body;

a hanger comprising a central horizontal member with an upper surface, a lower surface, a first end with a first axle bore, a second end with a second axle bore, and the pivot arm with a male spherical bearing surface on a distal end, wherein the upper surface comprises an upper recess and a central bore disposed within the upper recess, and wherein the lower surface comprises a lower opening connected with a hanger spherical bearing cavity, and wherein the upper recess, central bore, hanger spherical bearing cavity, and the lower opening are concentric, wherein a first wheel is connected with the first end and a second wheel is connected with the second end, and wherein the hanger comprises a second rigid body;

a revolute floating kingpin comprising an upper arm with a male bearing surface and an end, and a lower arm with an outside surface and an end with threads that passes through a hemispheric bearing and is secured by a nut, wherein the upper arm and the lower arm are connected and are perpendicular to each other comprising a third rigid body;

the compliant body comprising an elastomeric component with a top, a bottom, a circular side surface, and a central bore that is sized to receive and moveably secure the lower arm outside surface of the revolute floating king pin, and providing a primary motion of suspension;

an upper spherical joint moveably connecting the hanger pivot arm male bearing surface with the baseplate pivot arm spherical bearing cavity;

a lower spherical joint moveably connecting the hanger with the lower arm of the revolute floating kingpin;

a revolute joint moveably connecting the upper arm of the revolute floating kingpin with the baseplate and forming an axis of rotation, wherein a free float chamber and lower recess define the range of rotation of the revolute floating kingpin relative to the baseplate; and a hanger pivot axis between a centroid point of the upper spherical joint and a centroid point of the lower spherical joint.

12. The truck of claim 11 wherein a first truck is a front truck connected with a front end of the riding device and a second truck is a rear truck connected with a rear end of the riding device, and further comprising:

the tubular frame comprising a central frame member, a front tubular end member with an opening and interior mating surfaces to mate with a front baseplate, and a rear tubular end member with an open end and interior mating surfaces to mate with a rear baseplate;

a first longitudinal roll axis along a virtual line between a centroid point of the upper spherical joint of the front truck and a centroid point of the upper spherical joint of the rear truck; and a second longitudinal roll axis comprising a blended roll axis defined by the axis of rotation of the revolute joint and the first longitudinal roll axis; and four primary motions of leaning, steering, floating, and suspension.

13. The truck of claim 11 wherein the front end frame member is parallel to the central frame member and the rear end frame member is parallel to the central frame member.

14. The truck of claim 11 wherein the front end frame member is at an angle relative to the central frame member and the rear end frame member is at an angle relative to the central frame member.

* * * * *